United States Patent
De Peuter et al.

(10) Patent No.: US 11,163,956 B1
(45) Date of Patent: Nov. 2, 2021

(54) SYSTEM AND METHOD FOR RECOGNIZING DOMAIN SPECIFIC NAMED ENTITIES USING DOMAIN SPECIFIC WORD EMBEDDINGS

(71) Applicant: Intuit Inc., Mountain View, CA (US)

(72) Inventors: Conrad De Peuter, Chevy Chase, MD (US); Karpaga Ganesh Patchirajan, Plano, TX (US); Saikat Mukherjee, Fremont, CA (US)

(73) Assignee: Intuit Inc., Mountain View, CA (US)

(*) Notice: Subject to any disclaimer, the term of this patent is extended or adjusted under 35 U.S.C. 154(b) by 208 days.

(21) Appl. No.: 16/420,373

(22) Filed: May 23, 2019

(51) Int. Cl.
| | |
|---|---|
| *G06F 40/295* | (2020.01) |
| *G10L 15/22* | (2006.01) |
| *G06F 16/35* | (2019.01) |
| *G06N 20/00* | (2019.01) |
| *G06F 16/33* | (2019.01) |

(52) U.S. Cl.
CPC ........ *G06F 40/295* (2020.01); *G06F 16/3344* (2019.01); *G06F 16/3347* (2019.01); *G06F 16/35* (2019.01); *G06N 20/00* (2019.01)

(58) Field of Classification Search
CPC .... G06F 40/295; G06F 16/35; G06F 16/3347; G06F 16/3344; G06N 20/00; G10L 15/22; G10L 2015/223
See application file for complete search history.

(56) References Cited

U.S. PATENT DOCUMENTS

| | | |
|---|---|---|
| 6,912,536 B1 | 6/2005 | Ochitani |
| 7,092,922 B2 | 8/2006 | Meng et al. |
| 7,234,103 B1 | 6/2007 | Regan |
| 7,251,781 B2 | 7/2007 | Batchilo et al. |
| 7,254,569 B2 | 8/2007 | Goodman et al. |
| 7,343,551 B1 | 3/2008 | Bourdev |
| 7,500,178 B1 | 3/2009 | O'Donnell |
| 7,561,734 B1 | 7/2009 | Wnek |
| 7,765,097 B1 | 7/2010 | Yu et al. |
| 7,853,494 B2 | 12/2010 | Wyle |
| 8,032,822 B1 | 10/2011 | Artamonov et al. |
| 8,082,144 B1 | 12/2011 | Brown et al. |
| 8,214,362 B1 | 7/2012 | Djabarov |

(Continued)

FOREIGN PATENT DOCUMENTS

| | | |
|---|---|---|
| JP | 2013-164740 | 8/2013 |
| KR | 10-1585029 | 1/2016 |
| WO | WO 2009-061917 | 5/2009 |

OTHER PUBLICATIONS

Drummond et al., "Examining the Impacts of Dialogue Content and System Automation on Affect Models in a Spoken Tutorial Dialogue System," Proceedings of the SIGDAL 2011: the 12th Annual Meeting of the Special Interest Group on Discourse and Dialogue, pp. 312-318, Jun. 2011, copyright 2011 ACM, (Year: 2011).

(Continued)

*Primary Examiner* — Michael N Opsasnick

(74) *Attorney, Agent, or Firm* — Paradice and Li LLP

(57) ABSTRACT

A natural language processing method and system utilizes a combination of rules-based processes, vector-based processes, and machine learning-based processes to identify the meaning of terms extracted from data management system related text. Once the meaning of the terms has been identified, the method and system can automatically incorporate new forms and text into a data management system.

20 Claims, 6 Drawing Sheets

(56) References Cited

U.S. PATENT DOCUMENTS

| | | |
|---|---|---|
| 8,370,143 B1 | 2/2013 | Coker |
| 8,515,972 B1 | 8/2013 | Srikrishna et al. |
| 8,606,665 B1 | 12/2013 | Shaw |
| 8,655,695 B1 | 2/2014 | Qu et al. |
| 8,756,489 B2 | 6/2014 | Richardt et al. |
| 9,069,745 B2 | 6/2015 | Jacobsen et al. |
| 9,430,453 B1 | 8/2016 | Ho |
| 9,652,562 B2 | 5/2017 | Barrus |
| 9,892,106 B1 | 2/2018 | Lesner et al. |
| 2002/0083068 A1 | 6/2002 | Quass et al. |
| 2003/0026459 A1 | 2/2003 | Won et al. |
| 2003/0036912 A1 | 2/2003 | Sobotta et al. |
| 2003/0233296 A1 | 12/2003 | Wagner |
| 2004/0030540 A1 | 2/2004 | Ovil et al. |
| 2004/0039988 A1 | 2/2004 | Lee et al. |
| 2005/0108406 A1 | 5/2005 | Lee et al. |
| 2005/0108630 A1 | 5/2005 | Wasson et al. |
| 2005/0125746 A1 | 6/2005 | Viola et al. |
| 2005/0235811 A1 | 10/2005 | Dukane |
| 2005/0257148 A1 | 11/2005 | Goodman et al. |
| 2005/0267869 A1 | 12/2005 | Horvitz et al. |
| 2006/0062451 A1 | 3/2006 | Li et al. |
| 2006/0111990 A1 | 5/2006 | Cohen et al. |
| 2006/0155539 A1 | 7/2006 | Chen et al. |
| 2006/0178961 A1 | 8/2006 | Stanley et al. |
| 2006/0182554 A1 | 8/2006 | Stoizer |
| 2006/0184870 A1 | 8/2006 | Christen et al. |
| 2006/0235811 A1 | 10/2006 | Fairweather |
| 2006/0242180 A1 | 10/2006 | Graf et al. |
| 2007/0130134 A1 | 6/2007 | Ramsey et al. |
| 2007/0299949 A1* | 12/2007 | Macbeth ............ G10L 15/1822 709/223 |
| 2008/0065634 A1 | 3/2008 | Krinsky |
| 2008/0104506 A1 | 5/2008 | Farzindar |
| 2008/0147528 A1 | 6/2008 | Talan et al. |
| 2008/0154824 A1 | 6/2008 | Weir et al. |
| 2008/0227075 A1 | 9/2008 | Poor et al. |
| 2008/0270110 A1 | 10/2008 | Yurick et al. |
| 2008/0313174 A1 | 12/2008 | Barve et al. |
| 2009/0089046 A1 | 4/2009 | Uchimoto et al. |
| 2009/0119107 A1 | 5/2009 | Duncan |
| 2009/0119234 A1* | 5/2009 | Pinckney ............... G06N 20/00 706/12 |
| 2009/0182554 A1 | 7/2009 | Abraham et al. |
| 2009/0204881 A1 | 8/2009 | Murthy et al. |
| 2009/0276729 A1 | 11/2009 | Cantu-Paz |
| 2009/0327513 A1 | 12/2009 | Guo et al. |
| 2010/0005096 A1 | 1/2010 | Minagawa et al. |
| 2011/0087671 A1 | 4/2011 | Lee et al. |
| 2011/0258182 A1 | 10/2011 | Singh et al. |
| 2011/0271173 A1 | 11/2011 | Ait-Mokhtar et al. |
| 2012/0089659 A1 | 4/2012 | Halevi et al. |
| 2012/0272160 A1 | 10/2012 | Spivack et al. |
| 2013/0013612 A1 | 1/2013 | Fittges et al. |
| 2014/0019433 A1 | 1/2014 | Effrat et al. |
| 2014/0122988 A1 | 5/2014 | Eigner et al. |
| 2014/0164352 A1 | 6/2014 | Denninghoff |
| 2014/0173406 A1 | 6/2014 | Robelin et al. |
| 2014/0201126 A1* | 7/2014 | Zadeh ................... A61B 5/165 706/52 |
| 2014/0207782 A1 | 7/2014 | Ravid |
| 2014/0223277 A1 | 8/2014 | Kimber et al. |
| 2014/0258825 A1 | 9/2014 | Ghosh et al. |
| 2014/0282586 A1 | 9/2014 | Shear et al. |
| 2015/0007007 A1 | 1/2015 | Bryon et al. |
| 2015/0046785 A1 | 2/2015 | Byron et al. |
| 2015/0058188 A1 | 2/2015 | Bartlett et al. |
| 2015/0095753 A1 | 4/2015 | Gajera et al. |
| 2015/0127567 A1* | 5/2015 | Menon ............... G06Q 10/1053 705/321 |
| 2015/0206067 A1 | 7/2015 | Abu-Mostafa et al. |
| 2015/0254225 A1 | 9/2015 | Chirca |
| 2015/0309992 A1 | 10/2015 | Visel |
| 2015/0317295 A1 | 11/2015 | Sherry et al. |
| 2016/0019197 A1 | 1/2016 | Iasi et al. |
| 2016/0092557 A1* | 3/2016 | Stojanovic ............ G06F 16/254 707/723 |
| 2017/0075873 A1 | 3/2017 | Shetty et al. |
| 2017/0220540 A1 | 8/2017 | Wang et al. |
| 2017/0228655 A1* | 8/2017 | Alarie .................... G06N 5/047 |
| 2017/0239576 A1 | 8/2017 | Hsiao |
| 2017/0293607 A1 | 10/2017 | Kolotienko et al. |
| 2017/0337176 A1 | 11/2017 | Cietwierkowski et al. |
| 2018/0018310 A1 | 1/2018 | Unsal |
| 2018/0018311 A1 | 1/2018 | Mukherjee et al. |
| 2018/0018322 A1 | 1/2018 | Mukherjee et al. |
| 2018/0018582 A1 | 1/2018 | Unsal et al. |
| 2018/0018676 A1 | 1/2018 | Mukherjee et al. |
| 2018/0018740 A1 | 1/2018 | Unsal et al. |
| 2018/0018741 A1 | 1/2018 | Mukherjee et al. |
| 2018/0032497 A1 | 2/2018 | Mukherjee et al. |
| 2018/0341839 A1* | 11/2018 | Malak .................. G06K 9/4628 |
| 2020/0159990 A1 | 5/2020 | Mukherjee et al. |

OTHER PUBLICATIONS

Middleton et al., "Capturing Knowledge of User Preferences: Ontologies in Recommender Systems," K-CAP '01 pp. 100-107, copyright 2001, ACM (Year: 2001).

Research Gate, "Thread of Question and Answers on generating training set data from ResearchGate," retrieved from https://www.researchgate.net/post/How_can_I_Generate_the_training_data_From_the_dataset_of_images, Questions and answers dated Jul. 2015, pp. 1-5 (Year: 2015).

Wang et al., Action Prediction and Identification From Mining Temporal User Behaviors, WSDM'11, Feb. 9-12, 2011, Hong Kong, China, Copyright 2011 ACM, pp. 435-444 (Year: 2011).

Zhai et al., "Machine Translation by Modeling Predicate-Argument Structure Transformation," Proceedings of COLING 2012: Technical Papers, pp. 3019-3036, COLING 2012, Mumbai, Dec. 2012.

Hermens, Leonard A., et al., "A Machine-Learning Apprentice for the Completion of Repetitive Forms," Feb. 1994, IEEE, pp. 28-33.

Zhang, Chi, "Genetic Programming for Symbolic Regression," 2015, University of Tennessee, Knoxville, TN 37966, USA.

Glushko, Robert J., et al., "Document Engineering for e-Business," DocEng '02, Nov. 2002, USA, copyright 2002 ACM, p. 42-48.

Anonymous, "Form 2441—Child and Dependent Care Expenses," Retrieved from the Internet on Feb. 12, 2020 <URL: http://taxhow.net/static/form/pdf/federal/1580446800/f2441--2016.pdf>, (Year: 2016).

Borovicka et al., "Selecting Representative Data Sets," Advances in Data Mining Knowledge Discovery and Applications, Chap. 2, pp. 43-70, 2012.

Drechsler et al., "Generating Formal System Models from Natural Language Descriptions," IEEE, pp. 164-165 (Year 2012).

Kordos et al., "Instance Selection with Neural Networks for Regression Problems," Artificial Neural Networks and Machine Learning, ICANN 2012, Lecture Notes in Computer Science, vol. 7553.

Yan et al., Formal Consistency Checking over Specifications in Natural Languages, Design, Automation & Test in Europe Conference & Exhibition (DATE), pp. 1677-1682 (Year: 2015).

Toda et al., "A Probabilistic Approach for Automatically Filling Form-Based Web Interfaces," Proceedings of the VLDB Endowment 4.3 (2010), pp. 151-160, (Year: 2010).

Chu et al., "Data Cleaning: Overview and Emerging Challenges," Proceedings of the 2016 International Conference on Management of Data, pp. 2201-2206, Jun. 2016.

Frantzi, et al., "Automatic Recognition of Multi-Word Terms: The c-value/nc-value Method," International Journal on Digital Libraries 3.2, pp. 115-130, 2000.

Nakagawa et al., "A Simple but Powerful Automatic Term Extraction Method," COLING-02: Computerm 2002: Second International Workshop on Computational Terminology, 7-pages, 2002.

\* cited by examiner

SYSTEM AND METHOD FOR RECOGNIZING DOMAIN SPECIFIC NAMED ENTITIES USING DOMAIN SPECIFIC WORD EMBEDDINGS

BACKGROUND

Every year millions of people use electronic document preparation systems to assist in preparing electronic documents. Such electronic document preparation systems include tax return preparation systems, bookkeeping systems, and personal financial management systems. While these electronic document preparation systems can be very helpful to their users, the process of updating electronic document preparation systems can be very costly in terms of computing and human resources.

In the example of tax return preparation systems, due to the complexity of tax laws and the unique circumstances of each individual, tax return preparation can be a very complicated and confusing process. Electronic tax return preparation systems aim to simplify the tax return preparation process for users. To this end, electronic tax return preparation systems ask for tax related information from users and then automatically populate various fields in electronic versions of government tax forms. This process has the potential to greatly simplify the tax return preparation process for the users.

However, before an electronic tax return preparation system can accurately assist users to fill out a tax form, the tax form must be incorporated into the electronic tax return preparation system. Typically, computer software developers must work in conjunction with tax experts to understand exactly what each portion of the tax form means. The computer software developers then write the software that assists users to correctly fill out the form. This difficult process is further complicated by that fact that tax forms often refer to or request values from other tax forms or tax related documents. The result is that large amounts of human and computing resources are expended to incorporate a single new tax form into a tax return preparation system.

In order to reduce the amount of resources and time required to understand and incorporate a new tax form, some traditional tax return preparation systems have sought to automate this process. For example, some traditional tax return preparation systems have sought to use computing systems to automatically read the words of a tax form, understand the meaning of the words, and then generate software instructions to assist users to fill in the various lines of the tax form. Despite the potential for such a system, the implementation has proven very difficult for traditional tax return preparations systems.

Much of the difficulty comes from the fact that tax related terms are not always used with perfect consistency within tax documents. Variations in how terns are used in tax documents can result in computer systems misunderstanding what a tax form is calling for. Because there is a large number of tax terms and because there are complex relationships between the tax terms, traditional tax return preparation systems have not been able to automate the process of understanding and incorporating tax forms without introducing significant errors.

This is a serious problem, because if a traditional tax return preparation system misunderstands a tax term and uses an incorrect definition or calculation for a tax value there is often a ripple effect and the users of the traditional tax return preparation system can suffer greatly. Users may pay too much taxes, pay too little taxes, and possibly face serious legal consequences for filing incorrectly prepared tax forms. Users may then lose confidence in the tax return preparation system and abandon it.

As noted above, these issues and drawbacks are not limited to electronic tax return preparation systems. Any electronic document preparation system that assists users to electronically fill out forms or prepare documents can suffer from these drawbacks when the forms are updated, or new forms are released.

Additionally, the types of problems associated with automatically incorporating a new tax form also extend to efforts to try to automatically understand tax related questions or comments provided by users. If an automated customer support system cannot accurately understand the true meaning of a user's tax related question, then it is very unlikely that the automated customer support system will be able to provide meaningful assistance to the user. This can result in further frustration for the user and wasted computing resources for the tax return preparation system.

What is needed is a method and system that provides a technical solution to the technical problem of accurately understanding tax related text with an automated system.

SUMMARY

A computing system automatically reads text and identifies the words included in the text. The computing system uses a combination of techniques including spelling analysis, mathematical analysis, and artificial intelligence to determine the correct meanings of the words. When the computing system determines the correct meanings of the words, the computing system can update an electronic document preparation system based on the text.

The computing system includes an automated natural language processing system that utilizes a multi-tiered approach to correctly understand terms from text. For each term from the text, the system first determines whether the term is an exact match for a known term in a database of known terms that have already been incorporated into the system. If the term cannot be quickly matched to a known term using this rules-based approach, then the system uses a combination of vector-based analysis and machine learning processes to match the term to one of the known terms in the database. This multi-tiered approach is able to correctly understand terms from a tax form or other tax related text even when there is ambiguity in the terms.

The rules-based approach of the disclosed process works for simple cases without ambiguities. If the term matches a known term based on spelling, as well as the syntax of the sentence in which the term appears, then the term is matched with that known term. In this case, the system does not need to make additional inquiries for the term with the vector-based analysis and machine learning processes. If the term is not an exact match for a known term, then system proceeds to analyze the term with the vector embedding and machine learning processes.

The vectorization process compares a vectorized version of the term to a plurality of vectorized known terms. The plurality of vectorized known terms correspond to terms from a large body of related text that has been previously embedded in a vector space with a vectorization process. When the system encounters a term that cannot be matched with the rules-based approach, the system embeds the term in the vector space. The system then identifies a set of candidate terms that are closest to the term in the vector space.

After the system has identified the candidate terms from the vector space, the system uses a machine learning model to identify the candidate term that best matches the term. In particular, each candidate term is passed through the machine learning model to determine whether the candidate term is a match for the term. The machine learning model then identifies the candidate term that is the best match for the term. That candidate term is then established as a match of the term. When the system has determined the meaning for the terms from the text, the system can correctly incorporate the text into the electronic document preparation system.

Figure 1:
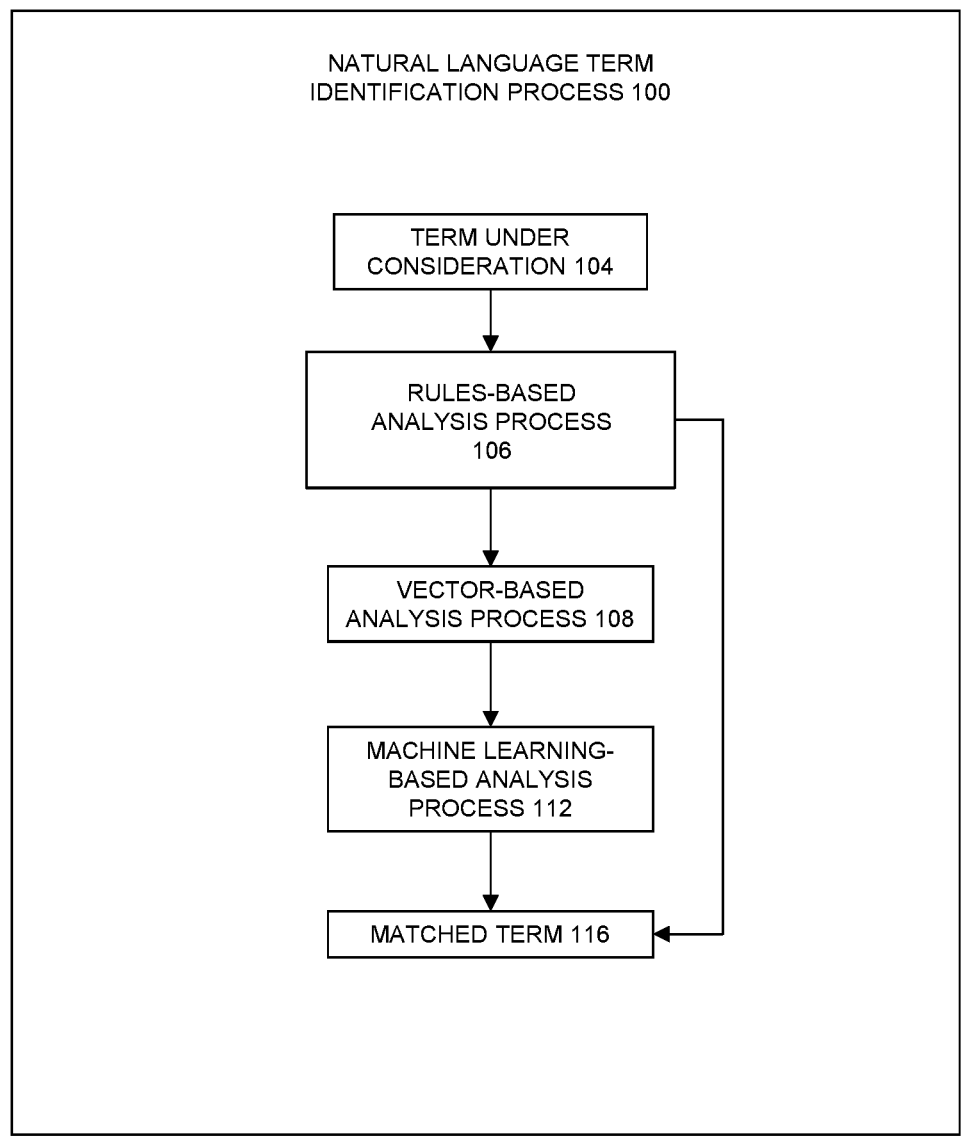
FIG. 1 illustrates a flow diagram of a natural language process for identifying terms extracted from text, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments.

Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

FIG. 1 illustrates a flow diagram of a natural language term identification process 100, in accordance with one embodiment. The natural language term identification process 100 matches a term under consideration to a known term from a database of known terms. In the illustrative example of use with tax preparation systems, the natural language term identification process 100 supplements a process for analyzing tax-related text with a natural language process in order to correctly understand the tax-related text. In order to properly understand the text, the meaning of each term in the text needs to be understood. The natural language process has access to a database of known and defined tax terms. The natural language term identification process 100 helps to match a term under consideration from the text to one of the known tax terms in the database.

While natural language term identification process 100 is described in relation to a tax-related text, the natural language term identification process 100 can be utilized to understand and incorporate text in domains other than the tax domain.

The natural language term identification process 100 receives a term under consideration and utilizes a combination of techniques to match the term under consideration to a known term. In particular, the natural language term identification process utilizes a combination of rules-based analysis processes, vector-based analysis processes, and machine learning-based analysis processes in order to match a term under consideration to a known term from a database of known terms. The combination of these analysis techniques and processes enables the natural language term identification process 100 to quickly and efficiently match a term under consideration to a known term, whether the term under consideration is a straightforward match or seemingly ambiguous.

Government tax forms include terms that have very specific tax related meanings, such as adjusted gross income, total income, earned income, and taxable income, to name a few. If these terms are conflated, mixed up, or otherwise misunderstood by a tax return preparation system, then the tax return preparation system will likely make errors in preparing tax returns, and these errors will often generate further errors, often in multiple steps or forms. All the various tax related terms and their proper meanings are stored by the tax return preparation system and mapped to specific variables that are used in software instructions for preparing tax returns electronically. When a new tax document needs to be incorporated into the tax return preparation system, or when a user asks a tax related question, the tax return preparation system needs to map the various terms included in the new tax form or tax query to the correct variable or known term used by the tax return preparation system.

In some cases, this mapping can be accomplished in a simple manner because a term under consideration has the exact spelling of a very specific tax related term, such as "married filing jointly" or "gross adjusted income". In other cases, the wording in tax related text can be more ambiguous. A portion of tax related text may refer simply to "income". A simple spelling or syntax comparison may be insufficient to determine what specific tax related entity is meant by "income". Does "income" refer to "gross adjusted income", "taxable income", "social security income", or another specific tax entity or value? Furthermore, in some cases tax related text may be misspelled, resulting in further difficulties. The natural language term identification process 100 is able to efficiently and effectively identify the correct term even when there is ambiguity.

The natural language term identification process 100 first passes a term under consideration 104 to a rules-based analysis process 106. The rules-based analysis process 106 is suited to matching a candidate term to a known term for the more straightforward cases. The rules-based analysis process 106 quickly and efficiently determines whether the term under consideration 104 is a simple match for a single known term from the database of known terms. If the rules-based analysis process 106 determines that the term under consideration 104 is a simple match for single known term from the database of known terms, then the rules-based analysis process 106 quickly identifies the matched term 116, without the need for other subprocesses to be utilized by the natural language term identification process 100. If the rules-based analysis process 106 does not identify a simple match, then the term under consideration is passed to the vector-based analysis process 108.

The rules-based analysis process 106 first identifies whether the term under consideration 104 is an identical match for a known term based on spelling. If the spelling of the term under consideration 104 is not an identical match for the spelling of a known term, then the natural language term identification process 100 ceases analyzing the term under consideration with the rules-based analysis process 106 and passes the term under consideration 104 to the vector-based analysis process. If the spelling of the term under consideration 104 is an identical match for the spelling of a known term, then the rules-based analysis process 106 proceeds to additional rules-based analysis techniques.

If the spelling of the term under consideration 104 is an identical match for the spelling of a known term, then the rules-based analysis process 106 analyzes the grammar and syntax of the text surrounding the term under consideration 104. The rules-based analysis process 106 analyzes the syntax of the text surrounding the term under consideration 104 in order to determine if the term under consideration 104 is being used in a way that is grammatically and syntactically expected for the known term for which the spelling is matched. If the grammar and syntax of the text surrounding the term under consideration 104 is compatible with expectations for the matched term, then the rules-based analysis process 106 formally considers that a match term 116 has been found for the term under consideration.

If the rules-based analysis process 106 does not identify a matched term, then the term under consideration 104 is passed to a vector-based analysis process 108. The vector-based analysis process 108 uses word vectorization techniques to identify candidate terms that are potential matches for the term under consideration. When candidate terms have been identified, the candidate terms are passed on for additional analysis.

The vector-based analysis process 108 converts the term under consideration 104 into a vector using known word or string vectorization processes. The vector-based analysis process 108 embeds the vector in a vector space. The known terms from the database of known terms have previously been converted to vectors and embedded in the vector space. The vector-based analysis process identifies the known term vectors that are closest to the vector of the term under consideration in the vector space. The known terms whose vectors are closest to the vector of the term under consideration are identified as candidate terms. The natural language term identification process 100 passes the candidate terms to the machine learning-based analysis process 112.

The machine learning-based analysis process 112 receives the candidate terms and identifies the candidate term that best matches the term under consideration 104. The machine learning-based analysis process 112 utilizes a machine learning model to analyze each candidate term. Each candidate term is passed through the machine learning model. The machine learning model determines how closely the candidate term matches the term under consideration 104. The machine learning-based analysis process 112 identifies which candidate term most closely matches the term under consideration 104. The machine learning-based analysis process 112 selects the most closely matching candidate term as the matched term 116.

The machine learning-based analysis process 112 trains the machine learning model with a supervised machine learning process. The machine learning-based analysis process generates a training set that includes a plurality of terms and text surrounding the plurality of terms. The machine learning-based analysis process utilizes the training set to train the machine learning model with one or more machine learning processes to determine if one term is a match for another based on the particular words included in the terms and based on the text surrounding the terms.

After the machine learning-based analysis process 112 has trained the machine learning model with the training set, the machine learning model is ready to analyze candidate terms to determine if they are match for a term under consideration. The term under consideration and candidate terms are then passed to the machine learning model. The machine learning model analyzes each individual candidate term with the term under consideration to determine if that candidate term is a match for the term under consideration. The machine learning model identifies the candidate term that is the best match for the term under consideration and establishes that candidate term as the matched term 116.

Figure 2:
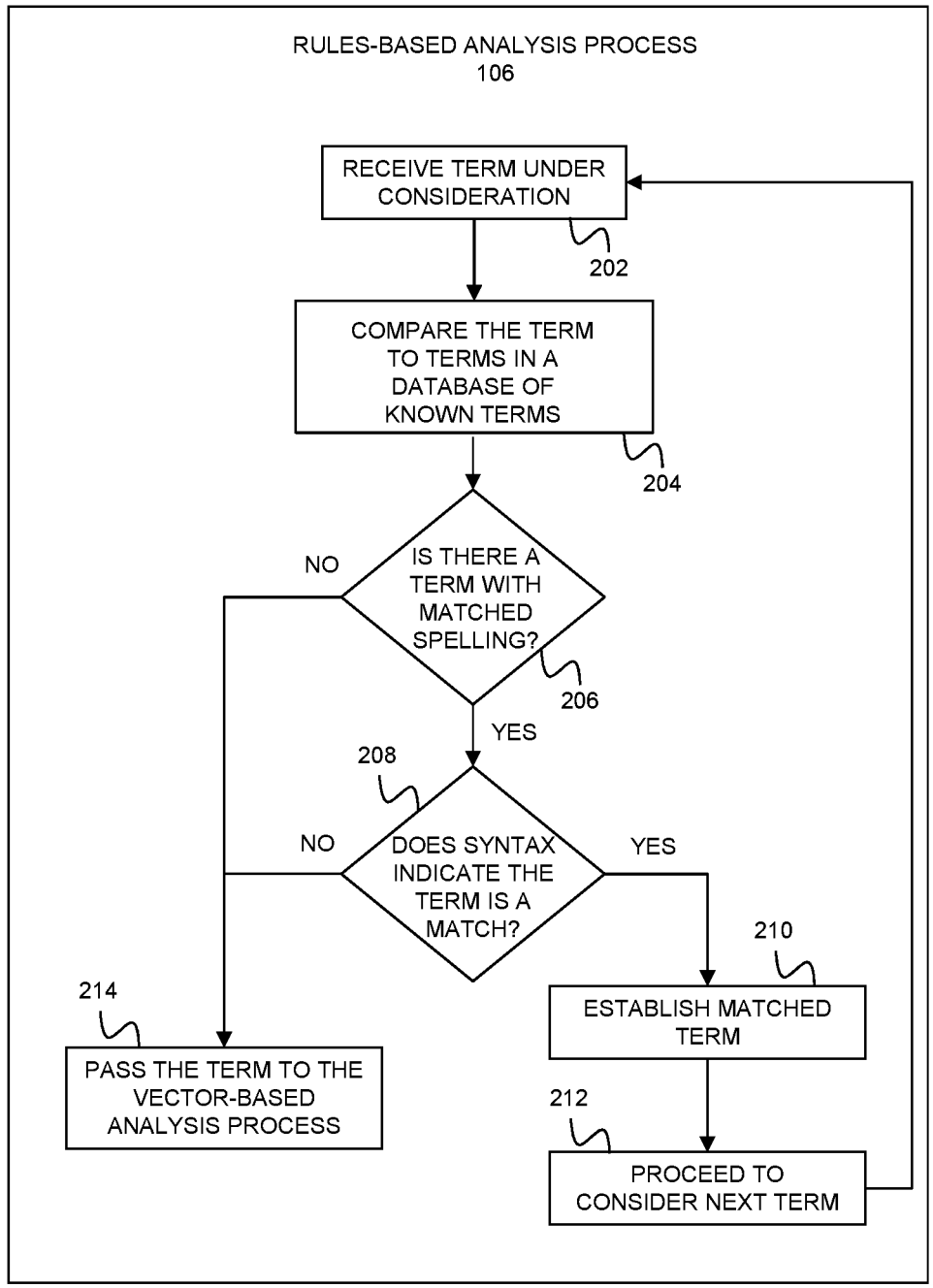
FIG. 2 illustrates a flow diagram of a rules-based analysis process of a natural language process for identifying terms extracted from text, in accordance with one embodiment.

FIG. 2 illustrates a flow diagram of a rules-based analysis process 106, a sub-process of a natural language process for identifying terms extracted from text, in accordance with one embodiment. The rules-based analysis process 106 utilizes spelling and syntactical analysis to match a term under consideration to a known term from a database of known terms. The rules-based analysis process 106 is able to quickly match the term under consideration to a known term in simple cases without ambiguity. If the rules-based analysis process 106 is able to establish a match with a known term, then other portions of the natural language term identification process 100 are bypassed.

At block 202 the rules-based analysis process 106 receives a term under consideration. The rules-based analysis process 106 receives the term under consideration from a term extraction process that extracts terms from a tax related text. The rules-based analysis process 106 helps to match the extracted term to an official tax related term from a database of known terms. The official tax related terms have specific tax meaning for government tax forms and for internal tax forms and processes of a tax return preparation system. The rules-based analysis process 106 seeks to determine whether the term under consideration is an exact match for a known term. From block 202, the process proceeds to block 204.

At block 204, the rules-based analysis process 106 compares the term to known terms from a database of known terms. The comparison seeks to determine whether the term under consideration is an exact match for a known term. If the term under consideration is an exact match for a known term, the rules-based analysis process can map the term under consideration to that matched term.

The comparison at block 204 includes comparing the spelling of the term under consideration to the spellings of known terms in the known terms database. The rules-based analysis process 106 seeks to determine whether or not the spelling of the term under consideration is an exact match for the spelling of one of the known terms from the known terms database. If the spelling of the term under consideration is an exact match for a known term from the database of known terms, then the known term is potentially a match for the term under consideration for the purposes of the rules-based analysis process 106. If the spelling of the term under consideration is not an exact match for any known term, then the term under consideration is not considered a match for any of the known terms in the known term database, for the purposes of the rules-based analysis process 106.

If the spelling of the term under consideration is an exact match for a known term, then the rules-based analysis process 106 performs additional analysis on the known term. In particular, the rules-based analysis process 106 performs an analysis of the text surrounding the term under consideration and the text surrounding the known term. Rules-based analysis process 106 seeks to determine whether the syntax of the text surrounding the term under consideration is compatible with the syntax of the text surrounding the known term. If the analysis of the syntax indicates that the term under consideration is compatible with the known term, then the rules-based analysis process can establish that the term under consideration is a match for the known term.

The database of known terms includes terms previously extracted from tax related text. The tax related text can include government tax forms, government tax worksheets, government tax instruction forms, and internal tax forms. The tax related text can also include internal tax forms, tax worksheets, and tax documents from an electronic tax return preparation system. Each known term appears in some context in one or more of these texts. A known term may appear in a sentence indicating how a particular line of a tax form should be populated. A known term may appear in a line of a tax form. The term may be associated with text that accompanies a particular screen of a tax return preparation system including instructions for users for a particular portion of a tax return preparation process. These surrounding texts can be utilized to assist in determining whether a known term is a match for a term under consideration.

Each sentence or line in which a known term appears is sorted into one of two groups: "used" and "defined". The usages of the known terms are sorted into these groups based on the syntax of the sentences or lines in which they appear. If a known term is the subject of the verb in a particular instance, then that particular instance is sorted into the "defined" group. If the known term is the object of the verb in a particular instance, then that particular instance is sorted into the "used" group.

In one example, the tax term "adjusted gross income" may appear in multiple places in various tax forms. Each usage of "adjusted gross income" is sorted into the "used" group or the "defined" group based on the syntax of that sentence or line. If a tax related form says "your adjusted gross income is the value from line 12", then that instance of adjusted gross income is sorted into the "defined" group because adjusted gross income is the subject of the verb. If in another instance, a tax related form says "enter your adjusted gross income", then that instance of adjusted gross income is sorted into the "used" group because adjusted gross income is the object of the verb.

The rules-based analysis process 106 utilizes the used and defined instances of a known term to determine whether the known term is a match for the term under consideration. In particular, the rules-based analysis process 106 analyzes the sentence in which the term under consideration is used in order to determine whether the term under consideration is the subject of a verb, or the object of the verb in order to determine whether the term under consideration corresponds to a "used" instance or a "defined" instance. When the rules-based analysis process 106 has determined whether the term under consideration corresponds to "used" or "defined", then the rules-based analysis process 106 compares the use of the term under consideration to a corresponding "used" or "defined" instance of the known term. If the comparison of these contexts indicates that the term under consideration is likely the same concept as the known term, then the rules-based analysis process 106 can determine that the known term is a match for the term under consideration. If the comparison of these contexts indicates that the term under consideration is likely not the same concept as the known term, then the rules-based analysis process 106 can determine that the known term is not a match for the term under consideration.

At block 206, if the rules-based analysis process 106 determines that there is a known term that has the same spelling as the term under consideration, then the process proceeds to block 208. At block 206, if the rules-based analysis process 106 determines that the term under consideration does not have the same spelling as any known term, then the process proceeds to block 214.

At block 208, if the comparison of the syntax of the context of the term under consideration and the known term with the same spelling indicate that the known term and the term under consideration are compatible, then the process proceeds to block 210. At block 208, if the comparison of the syntax of the context of the term in the consideration and the known term with the same spelling indicate that the known term and the term under consideration are not compatible, then the process proceeds to block 214.

At block 210, the rules-based analysis process 106 establishes that the term under consideration matches the known term with identical spelling. This is because the known term has the same spelling as the term under consideration and the syntaxes of the contexts are compatible. The match is only established at block 210 if the decision blocks 206 and block 208 are both affirmative. The decisions at block 206 and 208 are based on the comparison at block 204. Accordingly, in one embodiment blocks 206 and 208 can be part of block 204. From block 210, the process proceeds to block 212.

At block 212, the rules-based analysis process 106 proceeds to consider the next term under consideration. Accordingly, the rules-based analysis process 106 returns to block 202 and a new term under consideration is received. The rules-based analysis process 106 repeats the process for the new term under consideration.

If either of the decision blocks 206 and 208 return a negative answer, then the process proceeds to block 214. At block 214, the term under consideration is passed to the vector-based analysis process. The rules-based analysis process 106 arrives at block 214 when a match cannot be determined for the term under consideration based on matches in spelling and syntax.

In one embodiment, the rules-based analysis process 106 does not perform syntactical analysis on the context surrounding the term under consideration. Instead, the rules-based analysis process 106 can determine whether there is an exact match based solely on whether the spelling of the term under consideration is an exact match for one of the known terms. If the spelling of the term under consideration is an exact match for one of the known terms, the rules-based analysis process 106 can establish that the known term is a match for the term under consideration without any analysis of syntax.

Figure 3:
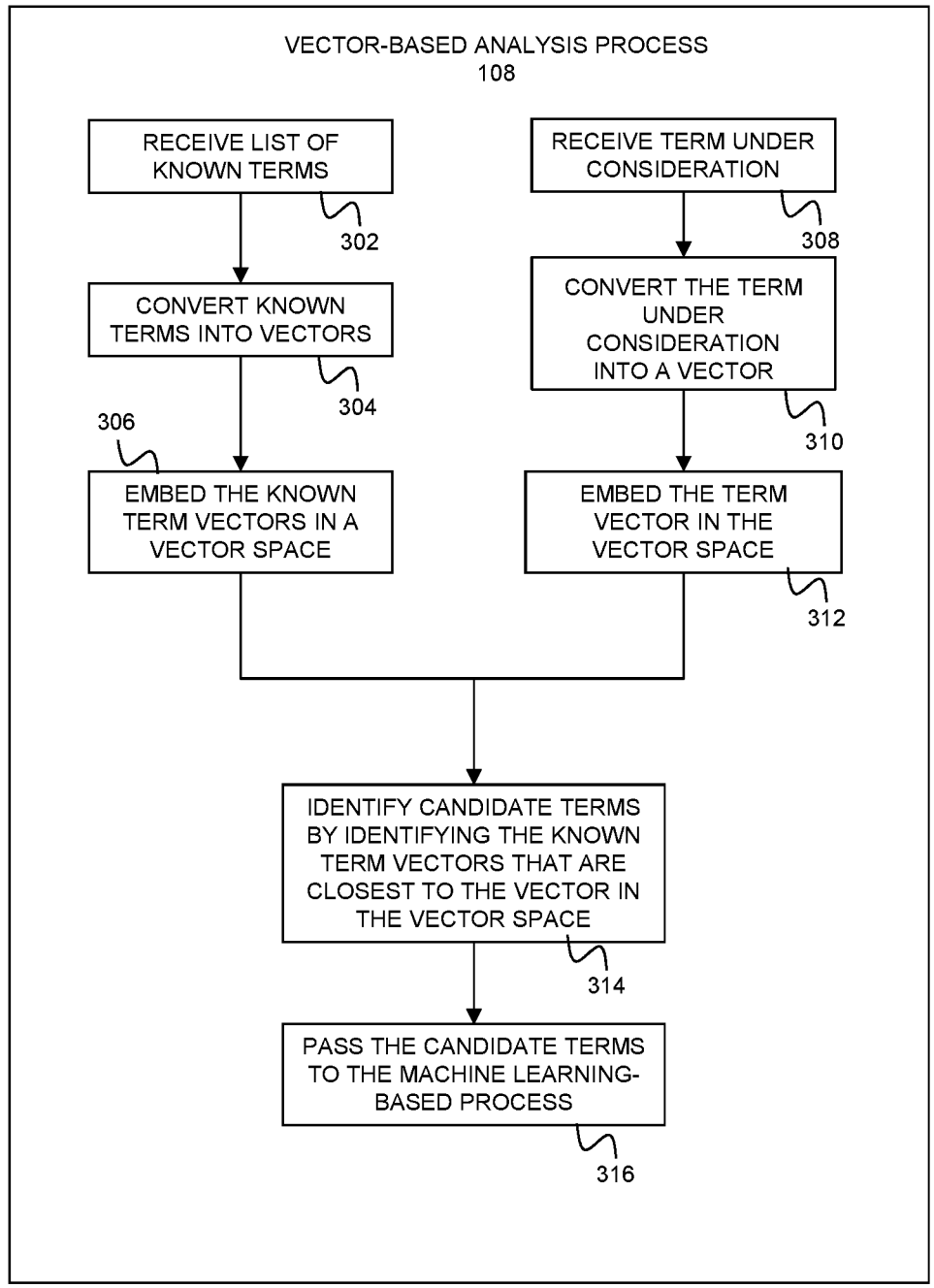
FIG. 3 illustrates a flow diagram of a vector-based analysis process of a natural language process for identifying terms extracted from text, in accordance with one embodiment.

FIG. 3 illustrates a flow diagram of a vector-based analysis process 108 of a natural language process for identifying terms extracted from text, in accordance with one embodiment. The vector-based analysis process 108 is a sub-process of the natural language term identification process 100 of FIG. 1. The natural language term identification process 100 for a term under consideration 104 arrives at the vector-based analysis process 108 only if the rules-based analysis process 106 of FIGS. 1 and 2 cannot quickly determine an exact match for that term under consideration.

Before the vector-based analysis process 108 performs any analysis on the term under consideration, the vector-based analysis process 108 first performs a vectorization and embedding process for the known terms from the database of known terms. The vectorization and embedding process for the known terms corresponds to blocks 302, 304, and 306 of the vector-based analysis process 108. Accordingly, blocks 302, 304, and 306 are performed for all known terms prior to analyzing any terms under consideration.

At block 302, the vector-based analysis process 108 receives the list of known terms. The list of known terms corresponds to the known terms from the database of known terms. The list of known terms includes not only the known terms, but the text or context associated with each known term. As set forth above, each known term appears in one or more locations in the tax related text that has been analyzed and previously incorporated in an electronic tax return preparation system. The list of known terms received by the vector-based analysis process 108 includes the text surrounding the known terms. From block 302 the process proceeds to block 304.

At block 304, the vector-based analysis process 108 converts the known terms into vectors. The vector-based analysis process 108 converts the known terms into vectors utilizing one or more vectorization processes known to those of skill in the art. The vectorization processes generate a numerical vector that represents the known term. The vectorization process generates the vector for a known term based on the string of text that is the known term, and based on the text that surrounds the known term. Accordingly, the vectorization process is based on both the characters in the known term and the text surrounding the known term.

The vectorization process in block 304 seeks to generate vectors that are representative of the semantic meaning of the known terms that they represent. The vectorization process generates vectors from the known terms in such a way that vectors that represent known terms that have similar semantic meanings will have similar values. The more similar two vectors are, the more similar are the semantic meanings of their corresponding known terms. Correspondingly, vectors that are very dissimilar from each other will represent known terms that are semantically very different from each other.

The vectorization process for words or strings of words can determine these semantic representations by utilizing analysis of a large corpus of text in which various words or strings may appear multiple times, although some words or strings may appear only a single time. The vectorization process can generate vectors representing the words or strings based on the words that cooccur with the words or strings. The vector for an individual word or string is generated based on the text that appears with each instance of the word or string in the corpus of text. Accordingly, the vector for an individual word or string is highly dependent on the context in which the word or string appears.

One result of the vectorization processes for words or strings is that known terms that have very different spelling may nevertheless have similar vectors. For example, the terms "charitable donations" and "contributions to nonprofits" are not similar in spelling, but they will often appear in very similar contexts surrounded by very similar words. Accordingly, these two terms would be represented by vectors with similar values.

The vectorization process for a term can be based on the words that occur both to the left and to the right of the term in a sentence. The vectorization process can be based on a fixed number of words before and after the term, for example up to 6 words before and after the term. The vectorization process can be based on words from multiple sentences before and after the term.

The vectorization process can utilize a vectorization model to generate vectors for the various known terms. The vectorization model receives as an input a corpus of tax related text. The corpus of tax related text can include government tax forms, government tax instruction sheets, government tax worksheets, government tax publications, tax related journal articles, and internal tax related forms, worksheets, and text generated by a tax return preparation system associated, in one example, with the natural language term identification process 100. The vectorization model utilizes one or more algorithms to generate a respective vector representation for each word or string in the corpus of tax related text. In one embodiment, the vectorization process retains the vectors of only the known terms rather than of all the words in the corpus of tax related text. Alternatively, the vectorization process can retain the vectors associated with each word or string.

In one embodiment, the vectorization model includes a string2vec model. In one embodiment, the vectorization model includes a word2vec model. In one embodiment, the vectorization model includes a sentence2vec model.

After the vector-based analysis process 108 has converted the known terms into vectors at block 304, the vector-based analysis process 108 proceeds to block 306. At block 306, the vectors for the known terms are embedded in a vector space. Each vector generated by the vectorization process has a same fixed length, or number of data fields. The vector space has a number of dimensions equal to the number of data fields in each vector. If, for example, each known term is represented by a vector having 25 data fields, then the vector space has 25 dimensions. Each vector is embedded in the vector space.

Although in FIG. 3 blocks 304 and 306 are represented as distinct blocks, in practice the embedding of the known term vectors is part of the process of converting the known terms into vectors. Accordingly, block 306 and block 304 may occur as part of a same process steps.

Once the known terms have been converted into vectors and embedded in the vector space as set forth above in relation to blocks 302, 304, and 306, the vector-based analysis process 108 is ready to analyze the term under consideration 104. Accordingly, blocks 302, 304, and 306 can be considered a pre-process that is performed prior to the analysis of any terms under consideration. Once vectors have been generated and embedded for the known terms, the vector-based analysis process 108 can proceed to analyze terms under consideration 104 in order to match the terms under consideration 104 to known terms.

At block 308, the vector-based analysis process 108 receives a term under consideration 104. The term under consideration 104 is passed to the vector-based analysis process 108 after the rules-based analysis process has failed to identify a match among the known terms for the term under consideration. From block 308, the vector-based analysis process 108 proceeds to block 310.

At block 310, the vector-based analysis process 108 converts the term under consideration into a vector. The vector-based analysis process 108 converts the term under consideration into a vector utilizing the same vectorization model or process that is used to convert the known terms into vectors at blocks 302, 304, and 306. Accordingly, the term under consideration is converted into a vector having the same length or number of data fields as the vectors that were generated from the known terms.

The vectorization process converts the term under consideration into a vector based on the context in which the term under consideration appears. Accordingly, the vectorization process converts the term under consideration into a vector based on the words that appear with the term under consideration. If the term under consideration is received from a user of a tax return preparation system as part of a question asked by the user, then the vectorization process generates the vector based on the other words that appear in the question. If the term under consideration is extracted from a new tax form to be incorporated into a tax return preparation system, the vectorization process generates the vector based on the other words that appear with the term under consideration in the new tax form. From block 310, the process proceeds to block 312.

At block 312, the vector-based analysis process 108 embeds the vector that represents the term under consideration into the vector space. Because the vector for the term under consideration has been generated utilizing the same vectorization process by which the known terms were converted into vectors, the vector representing the term under consideration 104 can be embedded in the same vector space as the known terms.

While block 312 and 310 are shown in FIG. 3 as separate blocks, in practice block 310 and 312 can correspond to a single process or step. When the vector is generated for the term under consideration, the vector is embedded in the vector space. Accordingly, converting the term under consideration to a vector can include embedding the vector in the vector space. From block 312, the vector-based analysis process 108 proceeds to block 314.

At block 314, the vector-based analysis process 108 identifies candidate terms for the term under consideration by identifying the known term vectors that are closest to the vector of the term under consideration in the vector space. Because the same vectorization process was used to generate both the known term vectors and the vector of the term under consideration, the known term vectors that are closest to the vector of the term under consideration in the vector space will correspond to the known terms that are most similar in semantic meaning to the term under consideration. The candidate terms therefore correspond to the known terms whose known term vectors are closest to the vector of the term under consideration, and are therefore most likely to be similar in meaning to the term under consideration.

In one embodiment, the candidate terms are identified by utilizing a vector clustering process. The vector clustering process identifies a cluster, or set, of vectors around the term under consideration. The clustering process can identify a selected number of the known term vectors that are closest to the vector of the term under consideration. For example, the clustering process can identify the ten known term vectors that are closest to the vector of the term under consideration in the vector space. Other numbers can be selected.

The vector clustering process can calculate the proximity between the vectors based on cosine similarity. The clustering process determines the cosine of the angle between the vector of the term under consideration and each of the known term vectors. The clustering process calculates the cosine between the vector of the term under consideration and the known term vector based on the inner product between the vector of the term under consideration and the known term vector. The value of the cosine of the angle between the vectors is a representation of the similarity of the vectors. A cosine value equal to 1 means that the angle between the vectors is 0 degrees and that the vectors are identical. The closer the value of the cosine is to 1, the more similar are the vectors. Accordingly, the clustering process can identify a selected number of the closest vectors based on the highest values in the cosine of the angles between the known vectors and the vector of the term under consideration.

After the vector-based analysis process 108 has identified the candidate terms at block 314, the process proceeds to block 316. At block 316, the vector-based analysis process 108 passes the candidate terms to the machine learning-based analysis process 112 so that the machine learning-based analysis process 316 can determine which of the candidate terms is the best match for the term under consideration.

Figure 4:
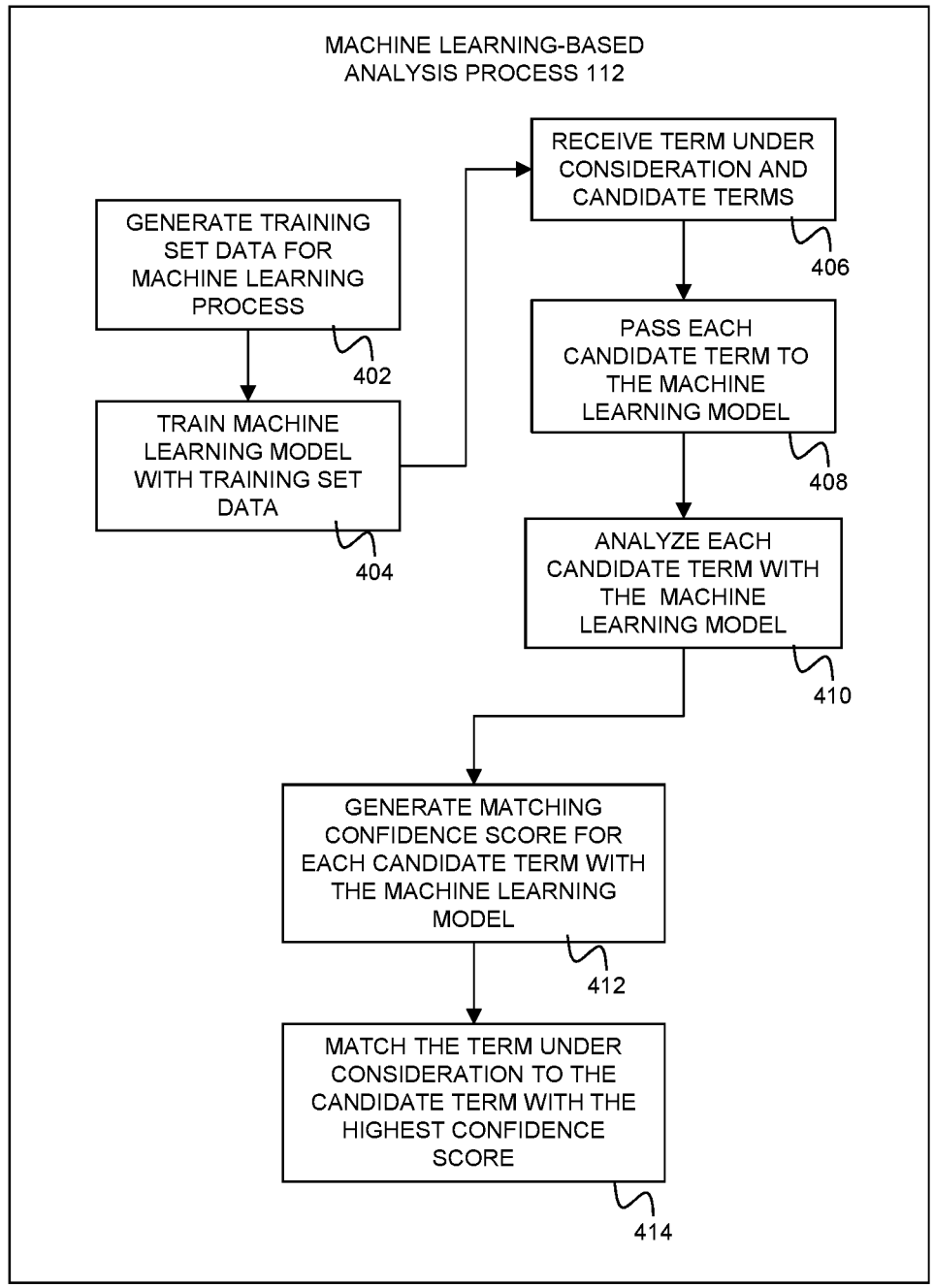
FIG. 4 illustrates a flow diagram of a machine learning-based analysis process of a natural language process for identifying terms extracted from text, in accordance with one embodiment.

FIG. 4 illustrates a flow diagram of a machine learning-based analysis process 112 of a natural language process for identifying terms extracted from text, in accordance with one embodiment. The machine learning-based analysis process 112 is part of a natural language term identification process 100. The machine learning-based analysis process 112 utilizes machine learning processes to determine which candidate term best matches the term under consideration 104.

Before performing a machine learning analysis for a term under consideration, the machine learning-based analysis process 112 performs a machine learning training process. Machine learning training process trains the machine learning model to identify a candidate term that best matches a term under consideration. This machine learning training process corresponds to the steps associated with blocks 402 and 404 in FIG. 4.

At block 402, the machine learning-based analysis process 112 generates training set data for a machine learning process 402. The training set data correspond to data that will be utilized to train a machine learning model to correctly match a candidate term to a term under consideration. The training set data can be generated by automated and human processes in order to train a machine learning model.

The training set data can include a plurality of terms from the corpus of tax related text. The training set data can include, for each term the surrounding text from which the term was drawn. The training set data can include a plurality of first terms that correspond to a training version of terms under consideration. The training set data can include a plurality of second terms that correspond to a training version of candidate terms. The second terms include variations on the first terms such as misspellings, missing words, and additional words. The first and second terms are labeled to indicate which of the second terms match the first terms, in spite of variations. The training set can be used to train a machine learning model to accurately identify whether a second term is a match for the first term.

In one embodiment, the training set data is taken from text that is included on various screens of a tax return preparation system. The tax return preparation system is a system that guides users through the process of electronically preparing a tax return. The tax return preparation system enables users to navigate through screens to provide data for preparing tax forms, to enable users to ask questions or obtain assistance, and to otherwise complete the task of electronically preparing a tax return. Each of the screens includes text. The text can include prompts for the user to provide certain types of information. The text can also include data further explaining the types of data requested, what they mean, and how the user can obtain the data. The first and second terms from the training set data can be taken from the text included in the screens. One reason that this can be helpful is because the screens often use unofficial terms to describe official tax terms because they will be read by the users who are not tax experts. This text is a good source to find terms that may or may not be a match for official tax terms. The training set data can also include second terms that are manually generated to include misspellings, removed words, and added words. Once the training set data has been generated at block 402, the process proceeds to block 404.

At block 404, the machine learning-based analysis process 112 trains the machine learning model with the training set data generated at block 402. The machine learning model is trained with a supervised machine learning process. The machine learning model is trained by providing a set of first terms corresponding to the training set version of terms under consideration and by providing a set of second terms corresponding to the training set version of candidate terms. The training set data is labeled to indicate which second terms are a match for which first terms. The training process trains the machine learning model to accurately make matching predictions that match the labels.

During the training set process, sets of first and second terms are fed to the machine learning model in iterations. In each iteration, the machine learning model predicts for each second term and first term, whether that second term is a match for a particular first term. The predictions are compared to the labels after each iteration so that the machine learning model is iteratively trained to accurately reproduce the labels.

The machine learning process can train the machine learning model to give particular weight to words that are present or missing from the second terms based on how common the missing or present words are. In one example, a term under consideration is "hurricane insurance", but a candidate term includes only the word "insurance". Because hurricane is an uncommon word it is likely that "insurance" is not a match for "hurricane insurance". It is assumed that a highly uncommon word in a term under consideration would also be present in a candidate term. To the contrary, more commonly occurring words are given less weight whether they are present or absent.

In one embodiment, the machine learning model is a random forest model. The random forest model is trained to predict whether second terms belong to a group of second terms that are matches for a first term. The random forest model can be used to predict not only inclusion in the group, but can also generate a confidence score indicating how confident the model is that the second term belongs in the group. When a second term belongs in the group for a first term, that term is considered a match for the first term. Accordingly, the confidence score indicates how likely it is that the second term is a match for the first term. Those of skill in the art will recognize, in light of the present disclosure, that other types of supervised machine learning models can be used for the machine learning-based analysis process 112 without departing from the scope of the present disclosure.

Once the machine learning model has been trained at block 404, the machine learning-based analysis process 112 is ready to begin determining whether candidate terms are matches for terms under consideration. Accordingly, from block 404 the process proceeds to block 406.

At block 406, a term under consideration and a plurality of candidate terms are received from the vector-based analysis process 108. The plurality of candidate terms correspond to terms that are semantically closest to the candidate term based on analysis of the embedded vectors of the term under consideration and known term vectors. From block 406 the process proceeds to block 408.

At block 408, each candidate term is passed to the machine learning model. The term under consideration is also passed to the machine learning model with the candidate terms. From block 408, the process proceeds to block 410.

At block 410, the machine learning-based analysis process analyzes each candidate term with the machine learning model. From block 410, the process proceeds to block 412.

At block 412, the machine learning model determines, for each candidate term, whether the candidate term is a match for the term under consideration. The machine learning model has been trained with the machine learning process as set forth above to predict whether a candidate term is a match for the term under consideration. Accordingly, at block 412, the machine learning model determines whether each candidate term is a match for the term under consideration.

It is possible that multiple candidate terms will be identified as a match for the term under consideration by the machine learning model. To remedy this issue, the machine learning model generates a confidence score for each candidate term. The confidence score indicates how strongly the candidate term matches the term under consideration. From block 412, the process proceeds to block 414.

At block 414 the machine learning-based analysis process 112 matches the term under consideration to the candidate term with the highest confidence score. Thus, if multiple candidate terms are determined to be matches for the term under consideration, the machine learning model selects the candidate term with the highest confidence score as the match for the term under consideration.

Figure 5:
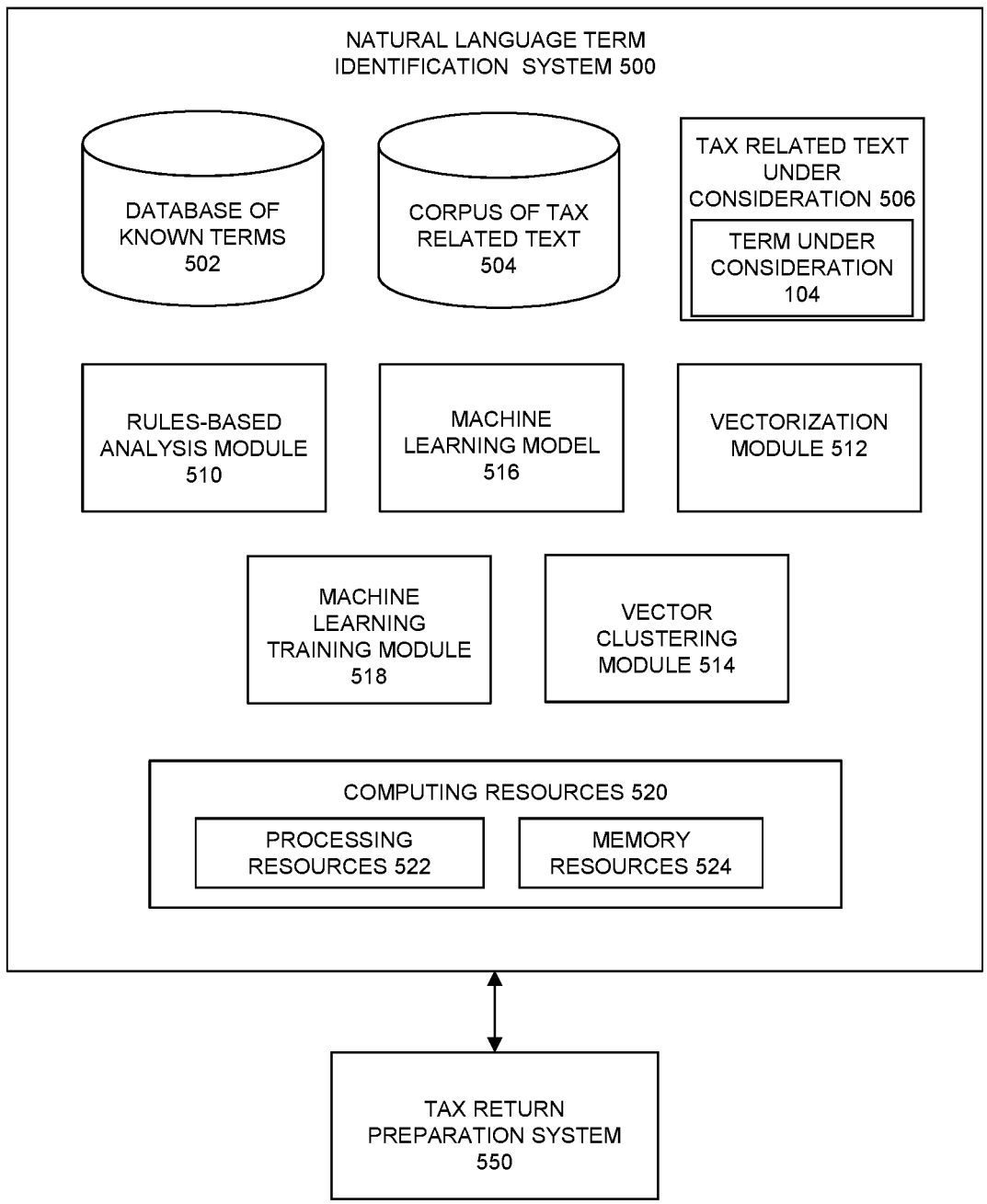
FIG. 5 illustrates a natural language term identification system for identifying terms extracted from text, in accordance with one embodiment.

FIG. 5 illustrates a block diagram of a natural language term identification system 500, in accordance with one embodiment. The natural language term identification system 500 performs the natural language term identification process 100 including the rules-based analysis process 106, the vector-based analysis process 108, and the machine learning-based analysis process 112 as shown in FIGS. 1-4 and described above in relation to FIGS. 1-4. The natural language term identification system 500 can communicate with the electronic tax return preparation system 550.

The natural language processing system 500 includes the database of known terms 502, the corpus of tax related text 504, tax related text under consideration 506, a rules-based analysis module 510, a vectorization module 512, a vector clustering module 514, a machine learning model 516, a machine learning training module 518, and computing resources 520, according to various embodiments.

The database of known terms 502 includes the known terms matched to specific tax related entities in the tax return preparation system 550. The corpus of tax related text 504 includes the body of government tax forms, government worksheets, government instruction forms, internal tax related forms of the tax return preparation system 550, tax journal articles, and other tax related text. The tax related text under consideration 506 corresponds to text currently being analyzed by the natural language term identification system 500.

The rules-based analysis module 510 is able to perform the processes and steps of the rules-based analysis process 106 as shown and described in relation to FIGS. 1-4. The vectorization module 512 is able to convert the term under consideration 104 and the known terms into vectors and to embed them in the vector space as shown and described in relation to FIGS. 1-4. The vector clustering module 514 is able to identify candidate terms by clustering the vectors in the vector space as shown and described in relation to FIGS. 1-4. The machine learning training module 518 trains the machine learning model 516 with a supervised machine learning process utilizing the training set data as shown and described in relation to FIGS. 1-4. The machine learning model 516 performs machine learning analysis in order to match one of the candidate terms to the term under consideration 104 as shown and described in relation to FIGS. 1-4.

The computing resources 520 include processing resources 522 and memory resources 524. The processing resources 522 can include one or more processors. The memory resources 524 can include one or more memories configured as computer readable media capable of storing software instructions and other data. The processing resources 522 are capable of executing software instructions stored on the computer readable media. In one embodiment, the various components, modules, databases, and engines of the natural language term identification system 500 utilize the computing resources 520 to assist in performing their various functions. Alternatively, or additionally, the various components, modules, databases, and engines can utilize other computing resources.

In one embodiment, the natural language term identification system 500 is able to update the tax return preparation system 550 after the term under consideration 104 has been matched to a known term. The natural language term identification system 500 can update the tax return preparation system 550 by updating a mapping of the term under consideration 104 within the tax return preparation system 550. The natural language term identification system 500 can update the tax return preparation system 550 by responding to a query of user of the tax return preparation system 550. The natural language term identification system 500 can update the tax return preparation system 550 by assisting the tax return preparation system 550 to incorporate the tax related text under consideration 506.

Figure 6:
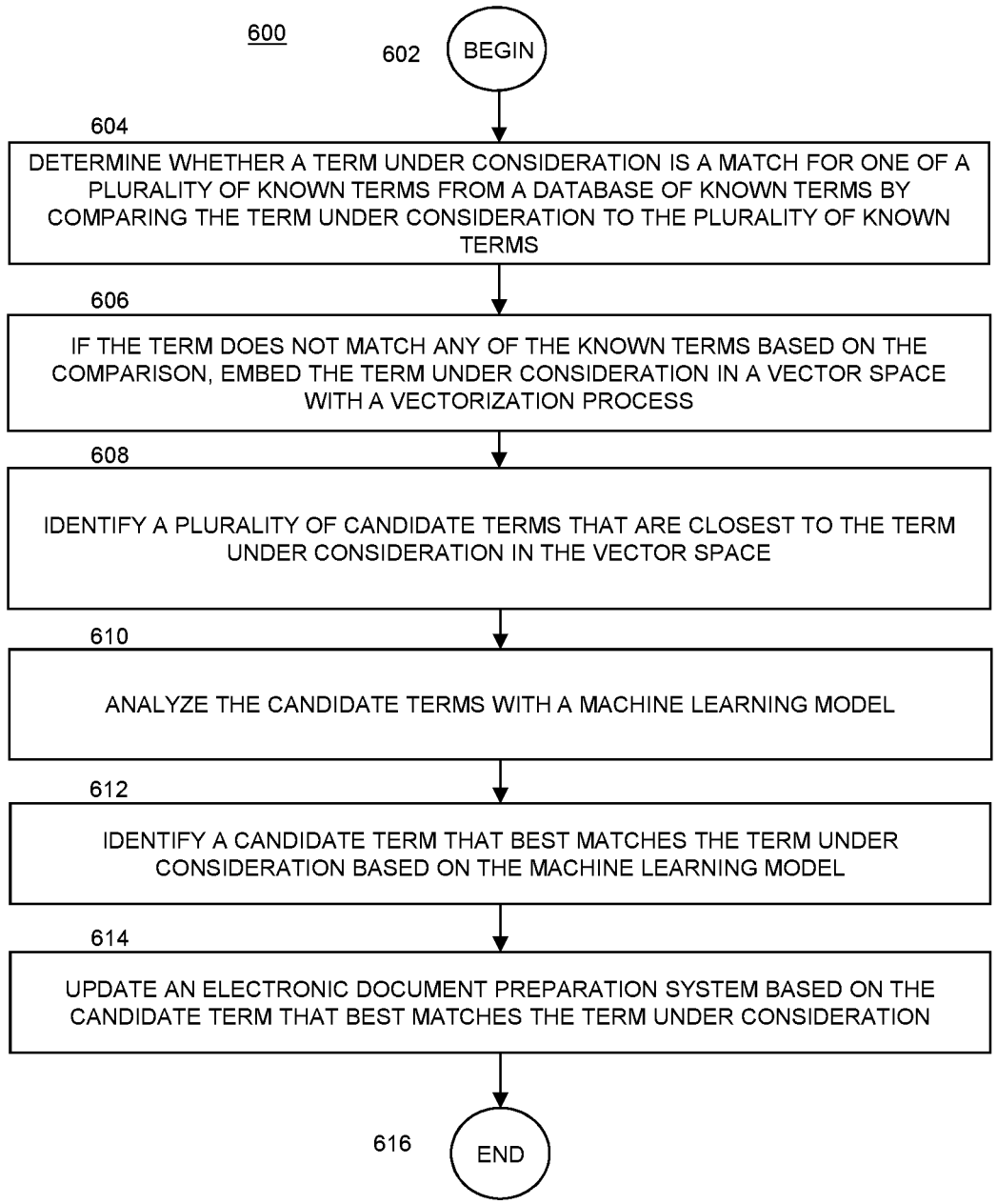
FIG. 6 illustrates a flow diagram of a process for matching terms extracted from text, in accordance with one embodiment.

FIG. 6 illustrates a flow diagram of a process 600 for matching terms extracted from text, in accordance with one embodiment. At 602 the process begins. From 602 the process proceeds to 604.

At 604 the process determines whether term under consideration from a tax related text is a match for one of a plurality of known terms from a database of known terms by comparing the term under consideration to the plurality of known terms. From 604 the process proceeds to 606.

At 606, if the term does not match any of the known terms based on the comparison, the process embeds the term under consideration in a vector space with a vectorization process. From 606 the process proceeds to 608.

At 608, the process identifies a plurality of candidate terms that are closest to the term under consideration in the vector space. From 608 the process proceeds to 610.

At 610 the process analyzes the candidate terms with a machine learning model. From 610 the process proceeds to 612.

At 612, the process identifies a candidate term that best matches the term under consideration based on the machine learning model. From 612 the process proceeds to 614.

At 614, the process updates an electronic document preparation system based on the candidate term that best matches the term under consideration. From block 614 the process proceeds to 616.

At 616, the process 600 ends.

As noted above, the specific examples discussed above are but illustrative examples of implementations of embodiments of the method or process for generating a list of domain specific terms to assist in natural language processing of domain related text. Those of skill in the art will readily recognize that other implementations and embodiments are possible. Therefore, the discussion above should not be construed as a limitation on the claims provided below.

In one embodiment, a computing system implemented method identifies terms extracted from the text. The method includes determining whether a term under consideration is a match for one of a plurality of known terms from a database of known terms by comparing the term under consideration to the plurality of known terms. If the term does not match any of the known terms based on the comparison, the method includes embedding the term under consideration in a vector space with a vectorization process. The method includes identifying a plurality of candidate terms that are closest to the term under consideration in the vector space. The method includes analyzing the candidate terms with a machine learning model. The method includes determining a candidate term that best matches the term under consideration based on the machine learning model. The method includes updating an electronic document preparation system based on the candidate term that best matches the term under consideration.

Matching a term under consideration to a known term based on rules-based analysis, vector-based analysis, and machine learning-based analysis is a technical solution to a long-standing technical problem and is not an abstract idea for at least a few reasons. First, matching a term under consideration to a known term based on rules-based analysis, vector-based analysis, and machine learning-based analysis is not an abstract idea because it is not merely an idea itself (e.g., can be performed mentally or using pen and paper). Second, matching a term under consideration to a known term based on rules-based analysis, vector-based analysis, and machine learning-based analysis is not an abstract idea because it is not a fundamental economic practice (e.g., is not merely creating a contractual relationship, hedging, mitigating a settlement risk, etc.). Third, matching a term under consideration to a known term based on rules-based analysis, vector-based analysis, and machine learning-based analysis is not an abstract idea because it is not a method of organizing human activity (e.g., managing a game of bingo). Fourth, although mathematics may be used in an analysis process the disclosed and claimed methods and systems of matching a term under consideration to a known term based on rules-based analysis, vector-based analysis, and machine learning-based analysis are not an abstract idea because the methods and systems are not simply a mathematical relationship/formula.

Matching a term under consideration to a known term based on rules-based analysis, vector-based analysis, and machine learning-based analysis yields significant improvement to the technical fields of natural language processing, electronic data management, and data processing, according to one embodiment. The present disclosure adds significantly to the field of electronic data management because matching a term under consideration to a known term based on rules-based analysis, vector-based analysis, and machine learning-based analysis increases the efficiency and accuracy with which data management systems can apply natural language processing techniques to domain specific text.

As a result, embodiments of the present disclosure allow for reduced use of processor cycles, memory, and power consumption, by improving the efficiency of the data management system. Consequently, computing and communication systems implementing or providing the embodiments of the present disclosure are transformed into more operationally efficient devices and systems. In addition to improving overall computing performance, matching a term under consideration to a known term based on rules-based analysis, vector-based analysis, and machine learning-based analysis significantly improves the field of data management systems by more efficiently performing natural language processes, according to one embodiment. Therefore, both human and non-human resources are utilized more efficiently.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for incorporating a text into the computing system, the method comprising:
    extracting a number of terms from a text under consideration;
    comparing each respective term of the number of terms to a plurality of known terms previously incorporated into the computing system;
    determining, for each respective term of the number of terms, whether the respective term matches an associated one of the plurality of known terms or does not match any of the plurality of known terms;
    for each matched term:
        mapping the matched term to its associated known term; and
        ceasing analysis of the matched term for the text under consideration;
    for each unmatched term:
        passing the unmatched term to a vectorization module;
        embedding, using the vectorization module, a vectorized version of the unmatched term in a vector space;
        comparing the vectorized version of the unmatched term to known term vectors previously embedded in the vector space, wherein each of the known term vectors is associated with one of the plurality of known terms;
        identifying a set of the known term vectors that are closest to the vectorized version of the unmatched term in the vector space based on the comparing;
        identifying a set of candidate terms for the unmatched term, wherein the set of candidate terms includes the known terms associated with the identified set of known term vectors;
        passing the set of candidate terms to a machine learning model;
        analyzing, using the machine learning model, each candidate term of the set of candidate terms;
        generating a confidence score for each candidate term, wherein the confidence score indicates a likelihood that the candidate term is a match for the unmatched term;
        identifying a best candidate term of the set of candidate terms having a highest confidence score; and
        mapping the best candidate term to the unmatched term; and
    incorporating the text under consideration into the computing system based on the mappings.

2. The method of claim 1, wherein identifying the set of the known term vectors that are closest to the vectorized version of the unmatched term includes:
    performing a vector clustering operation.

3. The method of claim 1, further comprising:
    training the machine learning model with a supervised machine learning process prior to passing the set of candidate terms to the machine learning model.

4. The method of claim 1, wherein embedding a vectorized version of the unmatched term includes:
    converting the unmatched term to the vectorized version of the unmatched term based on words that cooccur with the unmatched term in the text under consideration.

5. The method of claim 4, further comprising:
    prior to converting the unmatched term to the vectorized version of the unmatched term, converting the ones of the plurality of known terms to the known term vectors; and
    embedding the known term vectors in the vector space.

6. The method of claim 1, wherein the text under consideration is a user query.

7. The method of claim 6, wherein the incorporating includes:
    generating a response to the user query.

8. The method of claim 1, wherein comparing each respective term to the plurality of known terms includes:
    comparing a spelling of the respective term to spellings of the plurality of known terms.

9. The method of claim 8, wherein determining whether a respective term matches an associated one of the plurality of known terms includes:
    determining whether the respective term is spelled exactly like any of the plurality of known terms based on the comparing.

10. The method of claim 9, wherein comparing each respective term to the plurality of known terms includes:
    comparing a syntax of text associated with the respective term to syntax associated with a known term of the plurality of known terms exactly matching the spelling of the respective term.

11. A system for incorporating text into the system, the system comprising:
    one or more processors; and
    at least one memory coupled to the one or more processors, and storing instructions that, when executed by the one or more processors, cause the system to perform operations including:
        extracting a number of terms from a text under consideration;
        comparing each respective term of the number of terms to a plurality of known terms previously incorporated into the computing system;
        determining, for each respective term of the number of terms, whether the respective term matches an associated one of the plurality of known terms or does not match any of the plurality of known terms;

for each matched term:
  mapping the matched term to its associated known term; and
  ceasing analysis of the matched term for the text under consideration;
for each unmatched term:
  passing the unmatched term to a vectorization module;
  embedding, using the vectorization module, a vectorized version of the unmatched term in a vector space;
  comparing the vectorized version of the unmatched term to known term vectors previously embedded in the vector space, wherein each of the known term vectors is associated with one of the plurality of known terms;
  identifying a set of the known term vectors that are closest to the vectorized version of the unmatched term in the vector space based on the comparing;
  identifying a set of candidate terms for the unmatched term, wherein the set of candidate terms includes the known terms associated with the identified set of known term vectors;
  passing the set of candidate terms to a machine learning model;
  analyzing, using the machine learning model, each candidate term of the set of candidate terms;
  generating a confidence score for each candidate term, wherein the confidence score indicates a likelihood that the candidate term is a match for the unmatched term;
  identifying a best candidate term of the set of candidate terms having a highest confidence score; and
  mapping the best candidate term to the unmatched term; and
  incorporating the text under consideration into the computing system based on the mappings.

12. The system of claim 11, wherein identifying the set of the known term vectors that are closest to the vectorized version of the unmatched term includes:
  performing a vector clustering operation.

13. The system of claim 11, wherein execution of the instructions causes the system to perform operations further including:
  training the machine learning model with a supervised machine learning process prior to passing the set of candidate terms to the machine learning model.

14. The system of claim 11, wherein embedding a vectorized version of the unmatched term includes:
  converting the unmatched term to the vectorized version of the unmatched term based on words that cooccur with the unmatched term in the text under consideration.

15. The system of claim 14, wherein execution of the instructions causes the system to perform operations further including:
  prior to converting the unmatched term to the vectorized version of the unmatched term, converting the ones of the plurality of known terms to the known term vectors; and
  embedding the known term vectors in the vector space.

16. The system of claim 11, wherein the text under consideration is a user query.

17. The system of claim 16, wherein the incorporating includes:
  generating a response to the user query.

18. The system of claim 11, wherein comparing each respective term to the plurality of known terms includes:
  comparing a spelling of the respective term to spellings of the plurality of known terms.

19. The system of claim 18, wherein determining whether a respective term matches an associated one of the plurality of known terms includes:
  determining whether the respective term is spelled exactly like any of the plurality of known terms based on the comparing.

20. The system of claim 19, wherein comparing each respective term to the plurality of known terms includes:
  comparing a syntax of text associated with the respective term to syntax associated with a known term of the plurality of known terms exactly matching the spelling of the respective term.

* * * * *